United States Patent
Yu (10) Patent No.: US 8,418,655 B2
(45) Date of Patent: Apr. 16, 2013

(54) CAT SCRATCH BOARD STRUCTURE

(76) Inventor: Teng-Yi Yu, New Taipei (TW)

( * ) Notice: Subject to any disclaimer, the term of this patent is extended or adjusted under 35 U.S.C. 154(b) by 0 days.

(21) Appl. No.: 13/303,421

(22) Filed: Nov. 23, 2011

(65) Prior Publication Data

US 2012/0132149 A1    May 31, 2012

(30) Foreign Application Priority Data

Nov. 26, 2010    (TW) ................ 99222940 U (51) Int. Cl.
  *A01K 15/02*    (2006.01)
(52) U.S. Cl.
  USPC ................................................. 119/706
(58) Field of Classification Search .......... 119/702, 119/706, 707, 621, 652, 656, 660, 467; D30/158, D30/160
  See application file for complete search history.

(56) References Cited

U.S. PATENT DOCUMENTS

| | | | | |
|---|---|---|---|---|
| 3,085,551 A * | 4/1963 | Helmer | .......... | 119/706 |
| 4,253,423 A * | 3/1981 | Kaplan | .......... | 119/706 |
| 5,067,440 A * | 11/1991 | Hatten et al. | .......... | 119/706 |
| D322,494 S * | 12/1991 | Reynolds | .......... | D30/158 |
| 5,247,902 A * | 9/1993 | Williams | .......... | 119/706 |
| 5,450,819 A * | 9/1995 | Gray et al. | .......... | 119/706 |
| 7,958,851 B2 * | 6/2011 | Lamstein et al. | .......... | 119/706 |
| D644,797 S * | 9/2011 | Haaf | .......... | D30/160 |
| 8,065,977 B1 * | 11/2011 | Wilks | .......... | 119/706 |
| D665,138 S * | 8/2012 | Haaf et al. | .......... | D30/160 |
| 2001/0045191 A1 * | 11/2001 | Gear | .......... | 119/706 |
| 2002/0189549 A1 * | 12/2002 | Writer et al. | .......... | 119/706 |
| 2005/0011469 A1 * | 1/2005 | Lipscomb et al. | .......... | 119/706 |
| 2008/0149041 A1 * | 6/2008 | Lamstein et al. | .......... | 119/706 |
| 2008/0190377 A1 * | 8/2008 | Clowder | .......... | 119/706 |
| 2009/0188439 A1 * | 7/2009 | Simpson et al. | .......... | 119/706 |
| 2010/0050953 A1 * | 3/2010 | Fails, Jr. | .......... | 119/706 |
| 2011/0036303 A1 * | 2/2011 | Kimmel | .......... | 119/706 |
| 2012/0291718 A1 * | 11/2012 | Williams | .......... | 119/706 |

* cited by examiner

*Primary Examiner* — Trinh Nguyen
(74) *Attorney, Agent, or Firm* — Muncy, Geissler, Olds & Lowe, PLLC (57) ABSTRACT

The present invention provides an improved structure for a cat scratch board, which is structured to include an abrasive surface and at least one fastening structure, and claw filing wire material is horizontally arranged to cover the abrasive surface and an appropriate surface of a plate. A plurality of fastening units fasten the claw filing wire material to the plate to form the abrasive surface. The fastening structure is installed to the other surface from the abrasive surface of the plate, and the fastening structure is structured from a locking member and a connecting member. The locking member functions in coordination with the connecting member for clamping. A clamping space is formed between the fastening structure and the plate.

19 Claims, 7 Drawing Sheets

CAT SCRATCH BOARD STRUCTURE

BACKGROUND OF THE INVENTION (a) Field of the Invention

The present invention relates to a cat scratch board structure, and more particularly to cat scratch board structure having an improved abrasive surface design, and a fastening structure that extends and is disposed to a plate, which enables the cat scratch board to be easily assembled to and disassembled from a cat cage.

(b) Description of the Prior Art

Along with the improvement in living standards and changes in age structure, people continue to increase the content of their spiritual life, and raising of cats provides people with an interest in life.

Scratching is a natural instinct of cats, and filing of their claws enables them to be kept sharp. However, such behavior often causes damage to furniture in the home or electrical wires. Nevertheless, carrying out a surgical procedure to remove the claws of the family cat is opposed by CFA (The Cat Fanciers' Association, Inc.). Hence, in order to for a cat to be raised in the home, a claw filing tool is provided for the pet owner to provide the pet with a comfortable and safe claw filing environment.

Figure 1:
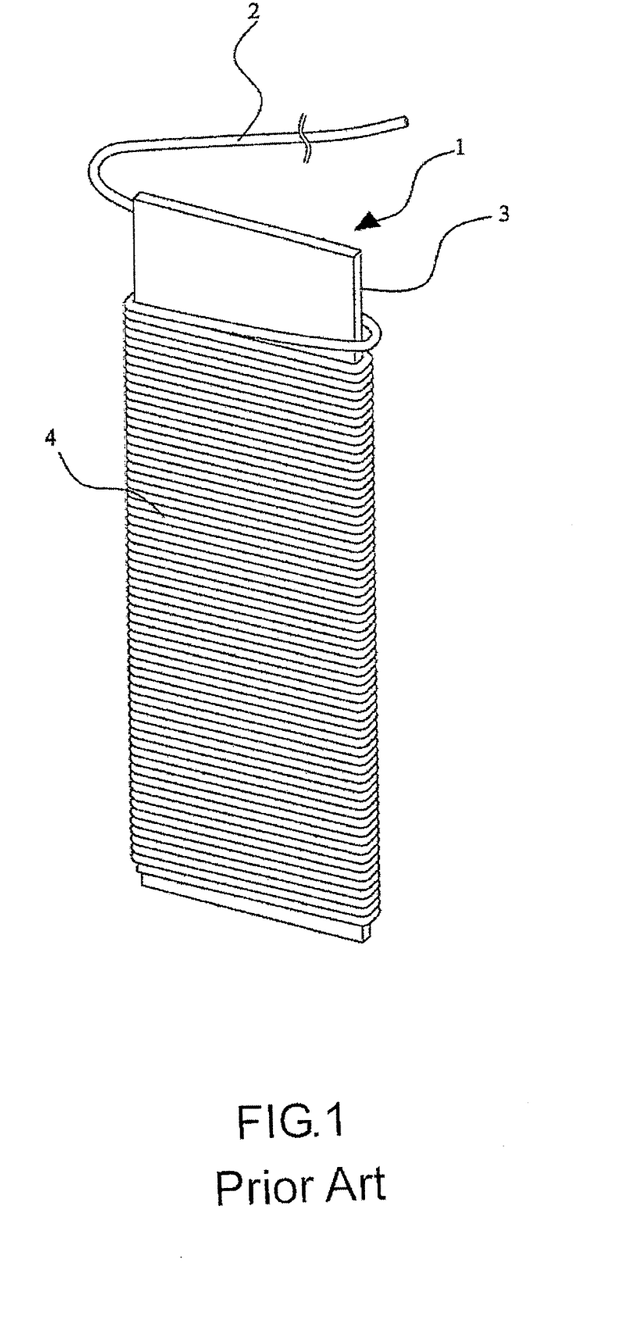
FIG. 1 is an elevational schematic view of a two-sided wound-type cat scratch board of the prior art.

Referring to FIG. 1, which shows a cat scratch board of the prior art, comprising a plate 1, and a wire-shaped material 2 winds around the plate 1 to fabricate a scratch board 3. Front and back surfaces of the scratch board 3 are respectively provided with a scratching surface 4 for a cat to scratch on. However, shortcomings of such a scratch board include the wire-shaped material 2 breaking after long term usage of the scratching surfaces 4, thereby causing the wire-shaped material 2 on the scratching surfaces 4 to come loose from the plate 1, resulting in the scratching surfaces 4 being no longer of use. Moreover, because the scratch board 3 is fabricated from the wire-shaped material 2 being wound around the plate 1, thus, the amount of wire-shaped material 2 used is relatively large, causing waste in manufacturing cost. Furthermore, many cats require training to file their claws on the cat scratch board rather than on furniture and other decorations in the home causing damage thereto. Hence, the pet owner must lock the cat in a cage to train the cat to use the scratch board to file its claws. However, the design of the cat scratch board of the prior art makes it difficult to install the cat scratch board to a cat cage, making it inconvenient to train a cat to use the cat scratch board to file its claws.

Hence, increasing the serviceable life of the abrasive surface and reducing wastage in the wire material, as well as enabling easy assembly to and disassembly from a cat cage are issues urgently waiting to be solved.

SUMMARY OF THE INVENTION

The primary objective of the present invention lies in providing an improved abrasive surface for a cat scratch board, thereby increasing the serviceable life of the abrasive surface, and reducing usage of wire material.

Another objective of the present inventions lies in further installing at least one fastening structure to the rear end of a scratch board to enable the cat scratch board to be quickly and easily assembled to and disassembled from a cat cage.

In order to achieve the above objectives, the present invention comprises a plate, and an appropriate surface of the plate is used as a scratching surface unit. The scratching surface unit uses at least one claw filing wire material to cover the plate and fabricate an abrasive surface. A position fixing end of the claw filing wire material is formed at one end of the plate and serves as a starting point. The claw filing wire material horizontally extends from the position fixing end to the other side of the plate and arranged on the scratching surface unit, at which point the claw filing wire material is folded back to form a retroflexed position fixing end. The claw filing wire material is similarly repeatedly horizontally arranged a multiple number of times in a closely packed fashion to form a plurality of the retroflexed position fixing ends, and then a position fixing terminal end is formed at another end of the scratching surface unit. In such a way, the claw filing wire material is made to cover the scratching surface unit to form the abrasive surface. The aforementioned position fixing end, the retroflexed position fixing ends and the position fixing terminal end are fitted with a plurality of fastening units to enable fastening the aforementioned claw filing wire material to the plate. In addition, at least one fastening structure is fitted to the other side from the abrasive surface, enabling a clamping space to form between the fastening structure and the plate. An adhesive layer is provided between the aforementioned claw filing wire material and the plate. The adhesive layer is self-adhesive, and is used to strengthen fastening of the claw filing wire material to the plate, as well as increasing durability of the abrasive surface. In a practicable embodiment, the aforementioned plate is provided with at least one hole, and a square head screw nut is disposed in the hole. A connecting member protrudes and extends outward from the plate, and the connecting member is a stop screw that is screwed into the interior of the aforementioned square head screw nut. The stop screw is provided with a wedge mortise at an appropriate area of the thread thereof, and the wedge mortise meshes with the square head screw nut, thereby preventing the stop screw from completely penetrating the hole in the plate.

A locking member is further mounted on the protruding portion of the aforementioned connecting member to enable corresponding sliding thereon. The locking member is provided with a through hole, and a square head screw cover nut is disposed in the through hole. The square head screw cover nut enables the aforementioned locking member to be mounted and slide on the connecting member. Moreover, a position fixing member locks onto the connecting member and forces the aforementioned locking member towards the plate clamping it thereto. The aforementioned position fixing member is a screw displacing butterfly nut that functions in coordination with the connecting member.

In a practicable embodiment, the aforementioned claw filing wire material is fabricated from tough wire-shaped material, such as either hemp rope, cotton rope or nylon rope.

In addition, in a practicable embodiment, the aforementioned fastening units are nail pins which are embedded into the interior of the plate for firm fastening, and the nail pins are either rivets, U-shaped nails or wire nails which can be embedded into hard material.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 2:
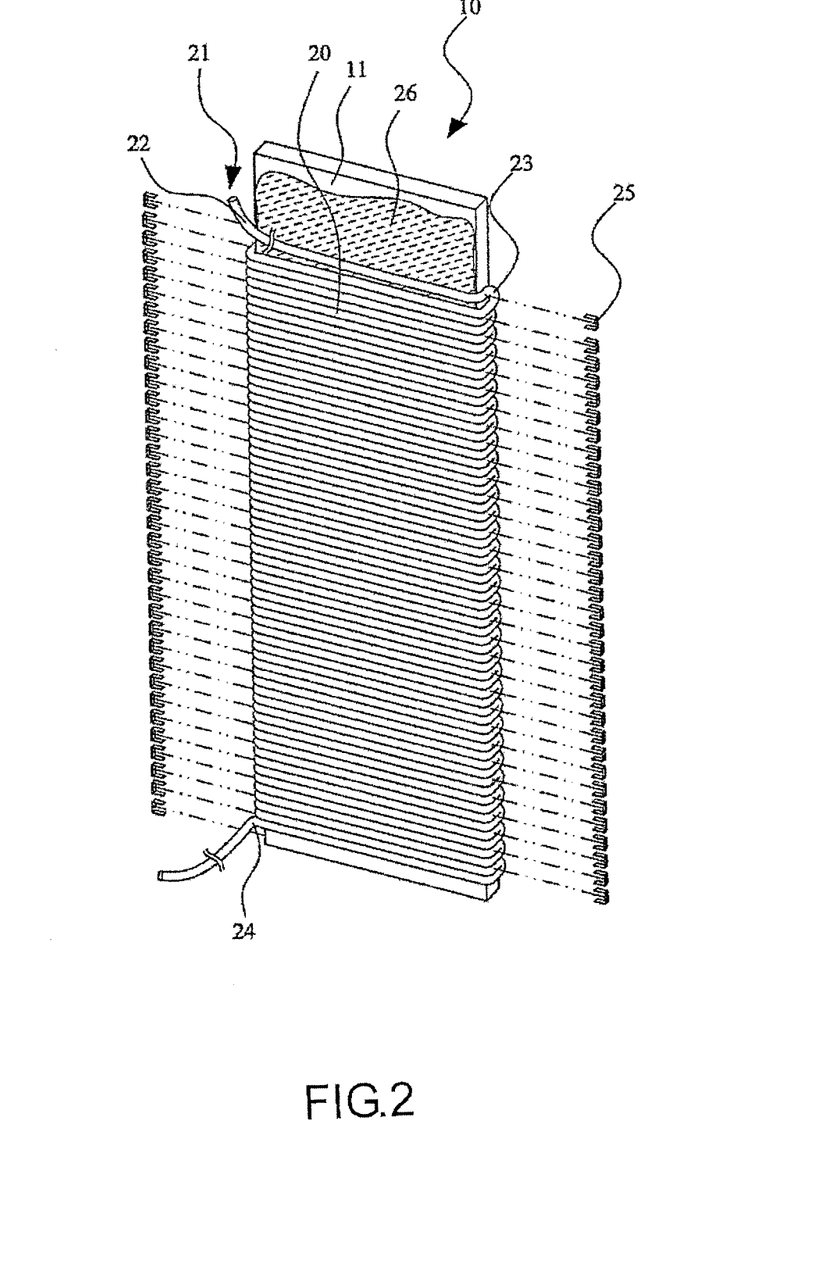
FIG. 2 is an exploded schematic view depicting the abrasive surface of a cat scratch board of the present invention.
Figure 3:
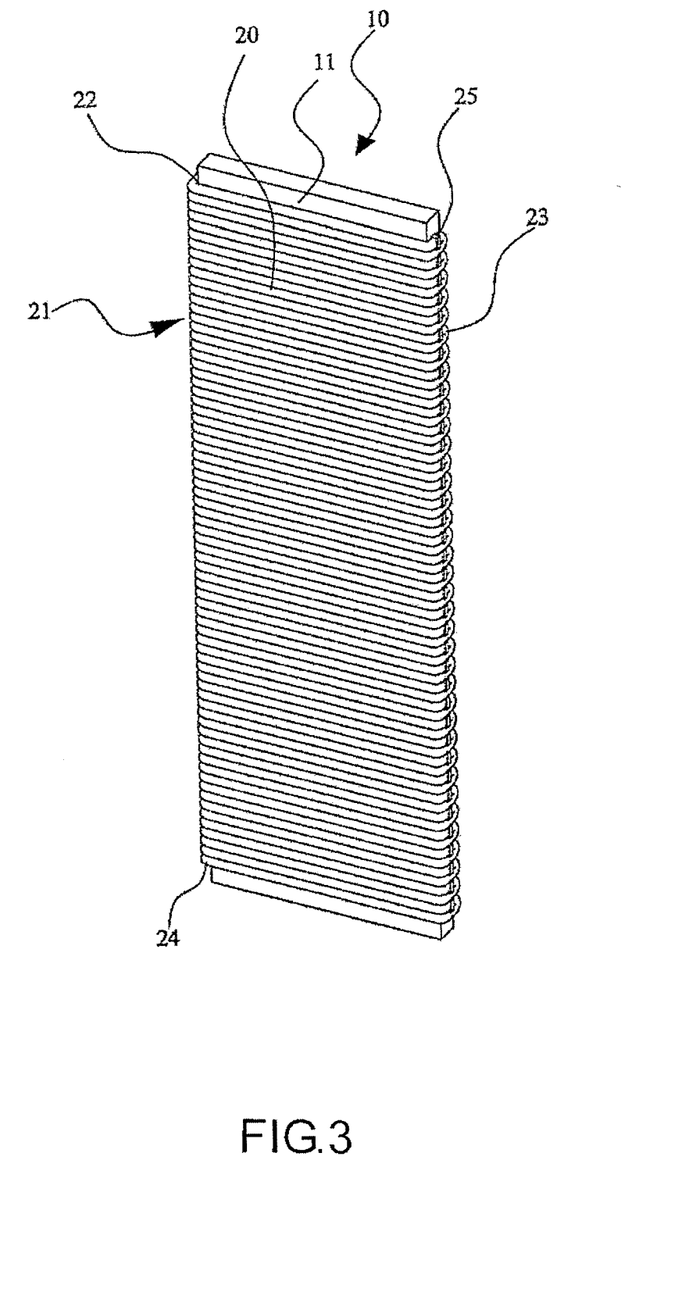
FIG. 3 is an elevational view depicting the abrasive surface of the cat scratch board of the present invention.

Referring to FIG. 2 and FIG. 3, which show the present invention comprising a plate 10, and an appropriate surface of the plate 10 is used as a scratching surface unit 11. The scratching surface unit 11 uses at least one claw filing wire material 21 to fabricate an abrasive surface 20. A position fixing end 22 of the claw filing wire material 21 is formed at one side of the plate 10, and the claw filing wire material 21 horizontally extends from the position fixing end 22 to the other side of the plate 10 and arranged on the scratching surface unit 11. The claw filing wire material 21 is then reverse directed at that side of the plate 10 to form a retroflexed position fixing end 23. The claw filing wire material 21 then again horizontally extends from the retroflexed position fixing end 23 to the other side of the plate 10 and arranged on the scratching surface unit 11, and the claw filing wire material 21 forms another retroflexed position fixing end 23 at this side of the plate 10. The aforementioned arrangement is repeated to appropriately cover the size of the abrasive surface 20. The aforementioned claw filing wire material 21 then forms a position fixing terminal end 24 at an appropriate side of the plate 10. In addition, the aforementioned position fixing end 22, the retroflexed position fixing ends 23 and the position fixing terminal end 24 are respectively fitted with a fastening unit 25. The fastening units 25 enable fastening the aforementioned claw filing wire material 21 to the plate 10, thereby completing fabrication of the abrasive surface 20.

In a practicable embodiment, an adhesive layer 26 is provided between the aforementioned claw filing wire material 21 and the plate 10, and the adhesive layer 26 is used to strengthen fastening of the claw filing wire material 21 to the plate 10. The aforementioned adhesive layer 26 is a self-adhesive, In addition, the aforementioned claw filing wire material 21 is tough wire-shaped material, such as either hemp rope, cotton rope or nylon rope. Moreover, the aforementioned fastening units 25 are nail pins which are embedded into the interior of the plate 20 for firm fastening. The aforementioned nail pins are either rivets, U-shaped nails or wire nails which can be embedded into hard material.

Figure 4:
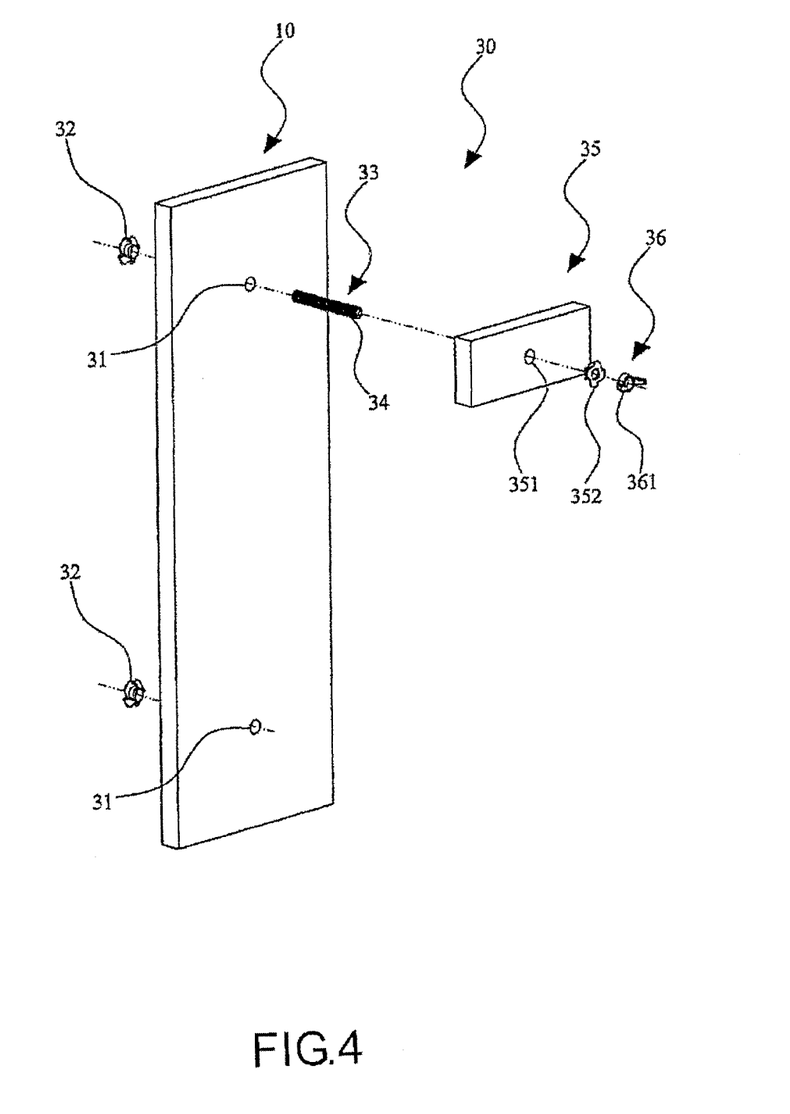
FIG. 4 is an exploded schematic view depicting the cat scratch board and a fastening structure of the present invention.

Referring to FIG. 4, which shows a preferred embodiment of the present invention, in which at least one fastening structure 30 further extends from and is disposed on the other side from the abrasive surface 20 of the plate 10. Holes 31 are provided in the aforementioned plate 10 respectively above and below the fastening structure 30, and a square head screw nut 32 is disposed in the interior of each of the holes 31. A connecting member 33 protrudes and extends outward from the plate 10, and the connecting member 33 is a stop screw 34 that screws into the aforementioned square head screw nut 32.

A locking member 35 is further mounted on the protruding portion of the aforementioned connecting member 33 to enable corresponding sliding thereon, and the locking member 35 is provided with a through hole 351. Moreover, the aforementioned stop screw 34 penetrates the locking member 35 and a position fixing member 36 extends from and is fitted thereto. The position fixing member 36 is a butterfly nut 361, and the butterfly nut 361 fixedly locks the stop screw 34 to force the locking member 35 towards the plate 10 and be clamped thereto. In addition, a square head screw cover nut 352 is disposed in the hole 351 in order to prevent the clamping pressure of the butterfly nut 361 from damaging the locking member 35. Moreover, removing the internally threaded square head screw cover nut 352 enables the connecting member 33 to correspondingly slide on the connecting member 33 and reduce the clamping pressure of the butterfly nut 361. The aforementioned butterfly nut 361 is provided with a thread corresponding to that of the stop screw 34.

Figure 5:
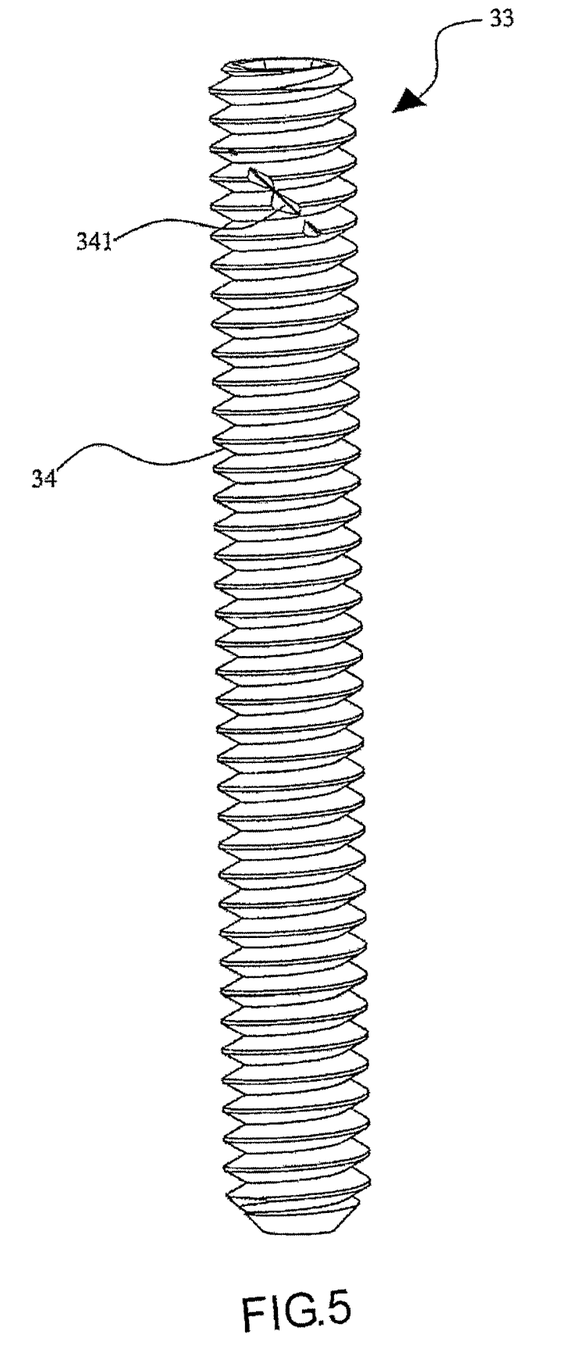
FIG. 5 is an enlarged elevational view of a stop screw of the present invention.

Referring to FIG. 5, which shows the aforementioned stop screw 34 provided with a wedge mortise 341 at an appropriate area of the thread thereof. In the depicted preferred embodiment, when the stop screw 34 is screwed onto the aforementioned square head screw nut 32, the wedge mortise 341 uses a broken teeth effect to enable the wedge mortise 341 to block the stop screw 34 from completely penetrating the hole 31 of the plate 10, thereby preventing the stop screw 34 from traversing the hole 31 and wearing away the claw filing wire material 21.

Figure 6:
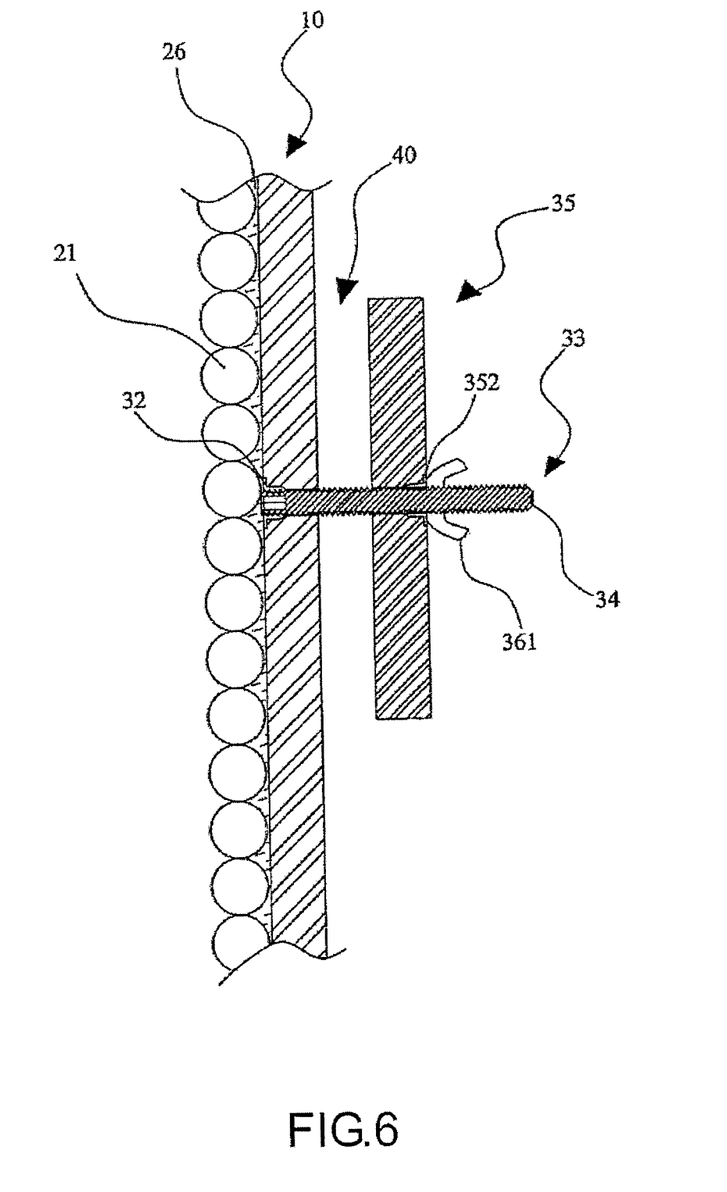
FIG. 6 is a cutaway view depicting joining of the fastening structure to the cat scratch board according to the present invention.
Figure 7:
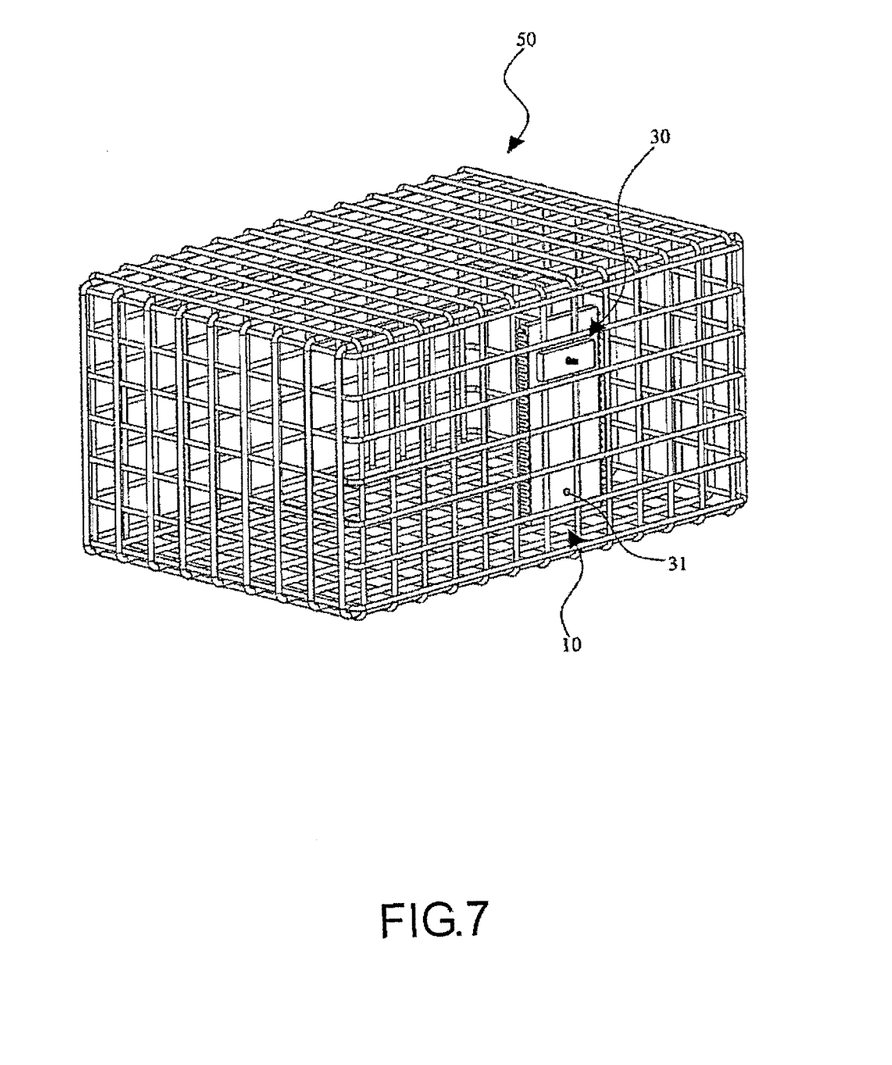
FIG. 7 is a schematic view depicting use of the cat scratch board joined to a cat cage according to the present invention.

Referring to FIG. 6 and FIG. 7, when the present invention is installed to a cat cage 50, the plate 10 is first fitted to an inner side of the cat cage 50, and the aforementioned stop screw 34 is then screwed into the square head screw nut 32 in the hole 31 at the upper end of the plate 10, after which the stop screw 34 penetrates the square head screw cover nut 352 of the locking member 35 on the outer side of the cat cage 50, thereby causing a clamping space 40 to form between the locking member 35 and the plate 10. Finally, the aforementioned butterfly nut 361 is used to fixedly lock the stop screw 34; and fixedly locking the stop screw 34 forces the locking member 35 to slide and be clamped to the plate 10, thereby fixing the entire cat scratch board to the cat cage 50 (as depicted in FIG. 7).

Moreover, when the hole 31 in the upper end of the aforementioned plate 10 is used to fixedly secure the fastening structure 30, then the downward force of gravity of the plate 10 eliminates any apprehensive over the plate 10 from freely swinging when a cat is scratching on the cat scratch board. Furthermore, because a cat usually only scratches the upper end of the plate 10, thus, when the abrasive surface 20 at the upper end of the plate 10 is damaged, then the plate 10 can be rotated through 180 degrees the plate, and the hole 31 at the other end of the plate 10 can be fixed to the fastening structure 30, thereby enabling a cat to scratch the entire abrasive surface 20.

In conclusion, the present invention uses a horizontal arrangement of claw filing wire material to cover a scratching surface unit, and then fastening units are used to fix the claw filing wire material to the two sides of a plate. Because the two sides of each horizontal wire material are fixed by the fastening units, and the wire material is only wound onto one side of the plate, thus, durability of an abrasive surface is increased and wastage of the wire material is reduced.

In addition, a fastening structure further extends and is disposed on the other side of the abrasive surface, and the fastening structure forms a clamping space between the plate and a locking member. A butterfly nut is used to fixedly lock a stop screw, which enables the locking member to clamp the plate onto a cat cage, and enables the cat scratch board to be quickly assembled to and disassembled from the cat cage.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A cat scratch board structure, comprising a plate, a scratching surface unit being disposed at an appropriate surface of the plate, wherein, the scratching surface unit comprises at least one claw filing wire material, the claw filing wire material forms a position fixing end at one end of the scratching surface unit, the claw filing wire material is horizontally arranged on the scratching surface unit, the claw filing wire material extends from the position fixing end to the other side of the scratching surface unit and folded back to form a retroflexed position fixing end, the claw filing wire material is similarly repeatedly horizontally arranged a multiple number of times in a closely packed fashion to form a plurality of the retroflexed position fixing ends, and then a position fixing terminal end is formed at another end of the scratching surface unit, accordingly, the claw filing wire material covers the scratching surface unit to form an abrasive surface; and a plurality of fastening units are fitted to the positions of the position fixing end, the retroflexed position fixing ends and the position fixing terminal end, thereby enabling the claw filing wire material to be fastened to and cover the plate.

2. The cat scratch board structure according to claim 1, wherein the claw filing wire material is hemp rope.

3. The cat scratch board structure according to claim 1, wherein the fastening units are nail pins able to embed into the interior of the plate and fix position.

4. The cat scratch board structure according to claim 1, wherein an adhesive layer is further provided between the claw filing wire material and the plate.

5. The cat scratch board structure according to claim 1, wherein the plate further comprises at least one fastening structure, the fastening structure is installed to the other side from the scratching surface unit.

6. The cat scratch board structure according to claim 5, wherein the fastening structure is fitted with a connecting member that connects to and protrudes outward from the plate, a locking member able to correspondingly slide on the connecting member is mounted on an outward protruding section of the connecting member, and a position fixing member locks onto the connecting member and forces the locking member towards the plate clamping it thereto.

7. The cat scratch board structure according to claim 6, wherein the plate is provided with at least one hole corresponding to the fastening structure, and a square head screw nut is disposed inside the hole, the connecting member is a stop screw that screw connects into the square head screw nut.

8. The cat scratch board structure according to claim 7, wherein the stop screw is provided with a wedge mortise on the section penetrating through the hole.

9. The cat scratch board structure according to claim 6, wherein the locking member is provided with a through hole, and a square head screw cover nut is disposed inside the through hole to enable the connecting member to be mounted and correspondingly slide thereon.

10. The cat scratch board structure according to claim 6, wherein the position fixing member is a screw displacing butterfly nut that functions in coordination with the connecting member.

11. A cat scratch board structure, comprising a plate, at least one claw filing wire material, wherein, the claw filing wire material covers the plate to form a scratching surface unit with an abrasive surface; at least one fastening structure is installed on the plate to enable forming a clamping space between the fastening structure and the plate the scratching surface unit being disposed at an appropriate surface of the plate, the claw filing wire material forms a position fixing end at one end of the scratching surface unit, the claw filing wire material is horizontally arranged on the scratching surface unit, the claw filing wire material extends from the position fixing end to the other side of the scratching surface unit and folded back to form a retroflexed position fixing end, the claw filing wire material is similarly repeatedly horizontally arranged a multiple number of times in a closely packed fashion to form a plurality of the retroflexed position fixing ends, and then a position fixing terminal end is formed at another end of the scratching surface unit, accordingly, the claw filing wire material covers the scratching surface unit to form the abrasive surface; and a plurality of fastening units fitted to the positions of the position fixing end, the retroflexed position fixing ends and the position fixing terminal end enable the claw filing wire material to be fastened to and cover the plate.

12. The cat scratch board structure according to claim 11, wherein the fastening structure is fitted with a connecting member that connects to and protrudes outward from the plate, a locking member able to correspondingly slide on the connecting member is mounted on an outward protruding section of the connecting member, and a position fixing member locks onto the connecting member and forces the locking member towards the plate clamping it thereto.

13. The cat scratch board structure according to claim 12, wherein the plate is provided with at least one hole corresponding to the fastening structure, and a square head screw nut is disposed inside the hole, the connecting member is a stop screw that screw connects into the square head screw nut.

14. The cat scratch board structure according to claim 13, wherein the stop screw is provided with a wedge mortise on the section penetrating through the hole.

15. The cat scratch board structure according to claim 12, wherein the locking member is provided with a through hole, and a square head screw cover nut is disposed inside the through hole to enable the connecting member to be mounted and correspondingly slide thereon.

16. The cat scratch board structure according to claim 12, wherein the position fixing member is a screw displacing butterfly nut that functions in coordination with the connecting member.

17. The cat scratch board structure according to claim 11, wherein the claw filing wire material is hemp rope.

18. The cat scratch board structure according to claim 11, wherein the fastening units are nail pins able to embed into the interior of the plate and fix position.

19. The cat scratch board structure according to claim 11, wherein an adhesive layer is further provided between the claw filing wire material and the plate.

\* \* \* \* \*